US009124824B2

(12) United States Patent
Smilansky et al.

(10) Patent No.: US 9,124,824 B2
(45) Date of Patent: Sep. 1, 2015

(54) PIXEL DESIGN WITH TEMPORAL ANALYSIS CAPABILITIES FOR SCENE INTERPRETATION

(75) Inventors: Zeev Smilansky, Meishar (IL); Massimo Gottardi, Trento (IT)

(73) Assignee: EZMA VISUAL SENSE LTD., Kfar Sava (IL)

( * ) Notice: Subject to any disclaimer, the term of this patent is extended or adjusted under 35 U.S.C. 154(b) by 166 days.

(21) Appl. No.: 13/997,278

(22) PCT Filed: Dec. 29, 2011

(86) PCT No.: PCT/IL2011/000968
§ 371 (c)(1),
(2), (4) Date: Jun. 24, 2013

(87) PCT Pub. No.: WO2012/093387
PCT Pub. Date: Jul. 12, 2012

(65) Prior Publication Data
US 2013/0277539 A1     Oct. 24, 2013

Related U.S. Application Data

(60) Provisional application No. 61/431,016, filed on Jan. 9, 2011.

(51) Int. Cl.
*H01L 27/00* (2006.01)
*H04N 5/335* (2011.01)
*H04N 5/217* (2011.01)
*H04N 5/359* (2011.01)
*H04N 5/367* (2011.01)

(52) U.S. Cl.
CPC ............. *H04N 5/3355* (2013.01); *H04N 5/217* (2013.01); *H04N 5/359* (2013.01); *H04N 5/3675* (2013.01)

(58) Field of Classification Search
CPC .. H04N 5/3355; H04N 5/3675; G06K 9/3241
USPC ....................................................... 250/208.1
See application file for complete search history.

(56) References Cited

U.S. PATENT DOCUMENTS

| | | | |
|---|---|---|---|
| 2004/0056176 A1* | 3/2004 | Shizukuishi | ................ 250/208.1 |
| 2006/0072014 A1 | 4/2006 | Geng et al. | |
| 2007/0064146 A1 | 3/2007 | Davidovic | |
| 2007/0091175 A1* | 4/2007 | Iddan et al. | .................... 348/135 |
| 2010/0141762 A1 | 6/2010 | Siann et al. | |
| 2012/0104231 A1* | 5/2012 | Elliott et al. | ................ 250/208.1 |

OTHER PUBLICATIONS

PCT Search and Written Opinion in PCT/IL2011/000968 dated May 16, 2012.

* cited by examiner

*Primary Examiner* — Thanh Luu
(74) *Attorney, Agent, or Firm* — Manelli Selter PLLC; Edward J. Stemberger

(57) ABSTRACT

Disclosed is a sensor device with pixels that in addition to sensing an image, performs captured image or scene analysis. The device saves further image processing downstream, is characterized by minimal charge movements and reduces a large fraction (about 90%) of the consumed electric energy as compared to the existing devices.

25 Claims, 7 Drawing Sheets

PIXEL DESIGN WITH TEMPORAL ANALYSIS CAPABILITIES FOR SCENE INTERPRETATION

TECHNOLOGY FIELD

The present device and method of pixel status determination provided by the device relate to the field of sensors and in particular imaging sensors.

BACKGROUND

Sensors and sensor networks are extensively used in different applications and in particular in applications of image or scene interpretation. In these applications a first objective is identifying temporal changes to the illumination level at any point in the image. In a regular camera sensor such as a CMOS or a CCD sensor, photons that impinge on the active pixel area are transformed into electrons that are retained in the pixel by its design. Subsequently, the captured electrons are moved out of the pixel area, their movement or electric current are transformed from analog to digital values, and the digital values are output to a receiving module for further processing. Movement of electric charges is by definition consumption of electrical energy. In existing cameras, the sensor alone consumes at least 30 mW of electric power. Subsequent processing by a processor requires substantially more power.

In some applications such as vehicle collision prevention, machining or semiconductor processing equipment, visual sensors can be mounted on the equipment itself to monitor operation of the equipment. In such applications sensors receive sufficient electric power supply from the adjacent equipment enabling their operation. Other applications such as surveillance, people tracking and access control require event monitoring across large areas over long periods. In such applications a number of sensors are distributed across the surveilled area, power being supplied by expensive infrastructure. In addition to power supply, communication means are required for transmission of captured images or image analysis results. In most of these applications, the time between events of interest (EOI, or alerts) is large with respect to the duration of the event itself, resulting in a very small operating duty-cycle. This means that a standard camera-processor setup must work continuously, capturing images, sending them to the visual processor, which processes them and most of the times discovers that there is no alert to send or decision to take. Nevertheless, continuous scene monitoring consumes significant electric power, and requires expensive and complex infrastructure, limiting its efficacy and applicability.

Electrical power supply as well as communications channel to a distributed sensor network over a large area is complex and expensive. Current sensors are often bulky, expensive, and sometimes limited to image recording or capture. Surveillance and similar tasks execution requires continuous sensors and in particular visual sensors operation. Such operation consumes hundreds or thousands of milliwatts and accordingly the sensors depend heavily on external power supply, limiting their usage. Sensors being capable of interpreting the visual world while consuming only a few milliwatts could be densely deployed to be employed in applications such as smart buildings, assisted living, safe cities, long perimeters and many more.

GLOSSARY

As used in the present disclosure "temporal charge value" (TCV) is one or more values reflecting pixel charge related to past or historical levels of pixel photon flux, for example, the average flux, or the maximal or minimal flux or other flux values.

As used in the present disclosure "current charge value" (CCV) denotes the existing pixel charge value corresponding to the present pixel photon flux.

The term "pixel status" means a member of a set of 2 or more determined states of a pixel, defined by a digital word defined in the electronic configuration of a pixel. In some embodiments the set of statuses includes two states, "hot" (i.e. suspicious, or substantially different from historic levels) and "cold" (i.e. normal, similar to historic levels). In this case the state is defined by a single bit.

The term "cold pixel" means a pixel which does not show significant pixel status changes from its historical levels.

The term "hot pixel" means a pixel which shows a significant pixel status change from its historical levels.

As used in the present disclosure the term "photodiode" or "pixel" means a device sensing photons or light flux and has the same meaning. It includes at least one photosensitive area and at least one embedded memory. The memory read-out could be digital or analog. The device could be implemented as a VLSI including a plurality or an array of pixels with a computational structure embedded into each of the pixels. The terms "photodiode" and "pixel" are used interchangeably in the current description.

As used in the present disclosure the term "image sensor" means a device that includes a plurality or an array of pixels.

BRIEF SUMMARY

The present disclosure describes an image sensor that in addition to sensing an image, performs captured image or scene analysis and saves further image processing downstream. The device is characterized by minimal charge movements and reduces a large fraction (90% or more) of the consumed power relative to a separate camera-processor architecture. The device pixel/s are designed to hold, apart from the current charge value reflecting the current level of photon flux, one or more charge values related to past or historical levels of the photon flux (for example the average flux, or the maximal or minimal flux, etc.) reflecting temporal charge values. Using the CCV and the TCV values together in the present pixel design, it is possible to compute a digital (binary) value describing the current pixel at any given time as being a "cold pixel" or a "hot pixel". With this design, a simple circuit in the sensor can count the number of hot pixels and decide whether further processing is required. There are numerous applications, where relatively few abrupt illumination flux or scene changes occur, resulting in a fraction the pixels in the sensor having "hot" status, unless a physical object (such as a car or a person) moves into the scene. Typically, the expected number of hot pixels is kept relatively constant at about $1/100$ of the total number of pixels. Thus a pixel is "hot" approximately every 100 frames. This keeps the sensitivity of the sensor constantly at its maximum. Since at this mode relatively few charges are moving, power consumption is significantly reduced.

DETAILED DESCRIPTION

Figure 1A:
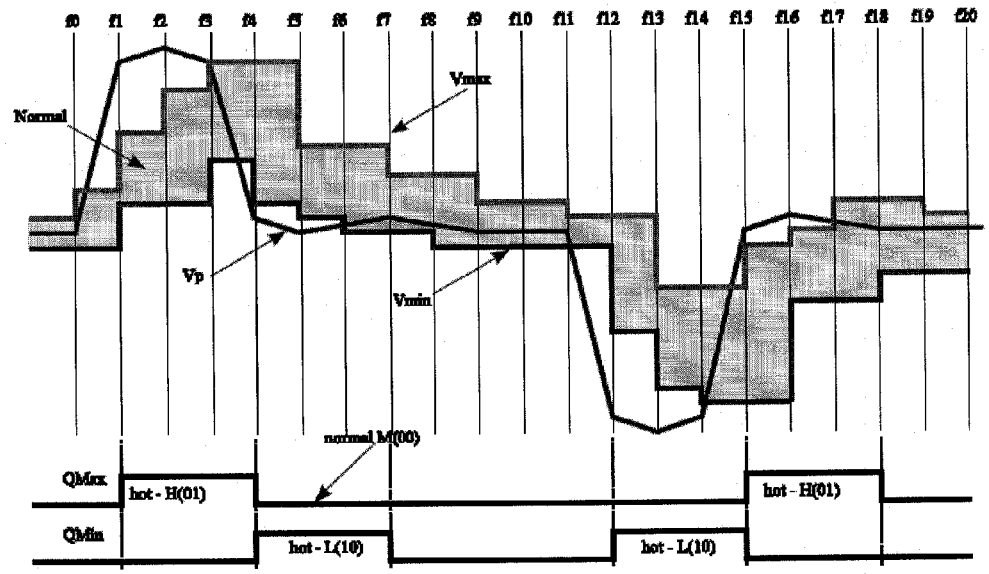
FIGS. 1A and 1B are examples explaining the principle of operation of the present pixel.
Figure 1B:
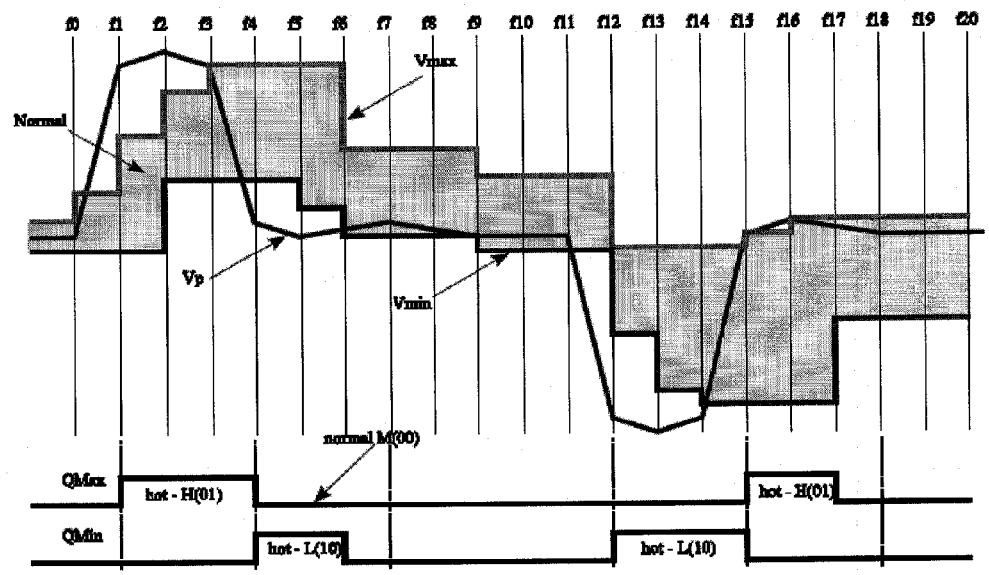
Figure 3:
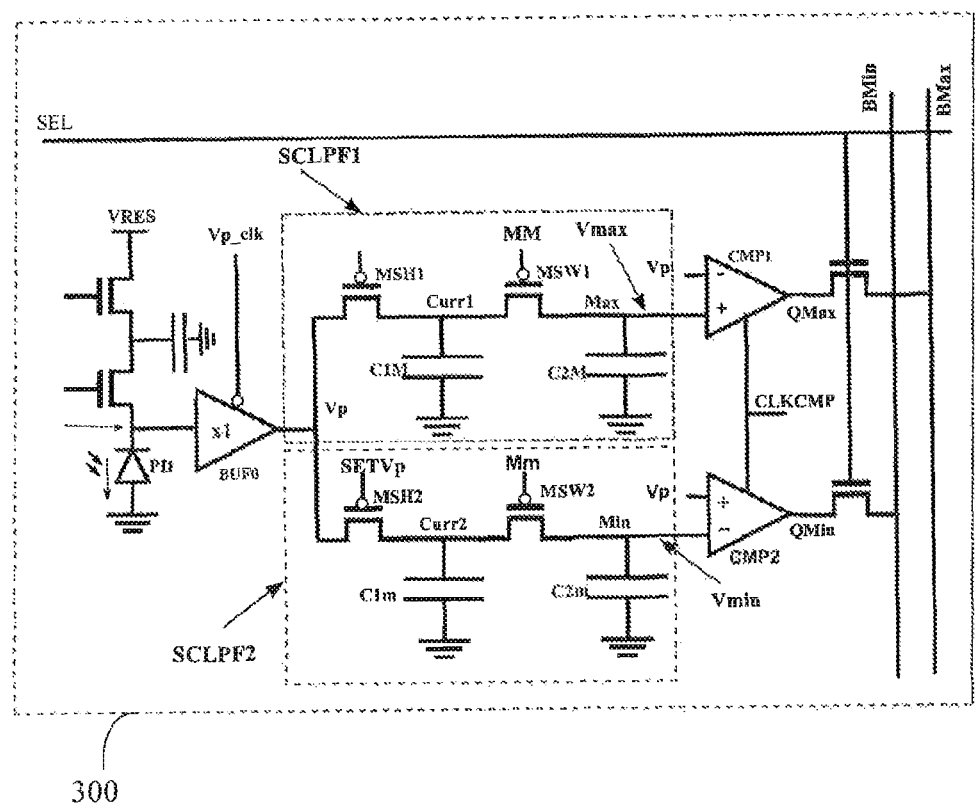
FIG. 3 is an example of the present pixel schematic.

FIGS. 1A and 1B are examples of the principle of operation of the present pixel. The pixel or photodiode includes a photosensitive area operative to sense a visual scene and two embedded memories ($M_{MAX}$, $M_{MIN}$). The memories keep trace of the historical voltage levels of the historical pixel statuses or activity or operation along time and in particular of the thresholds operative to change the pixel status. The historical pixel status is recorded and maintained by two memories that represent two different TCVs or levels in the pixel. The two levels recorded in the memories define a voltage range inside which the CCV is to be considered "normal" and does not trigger any additional pixel activities or status flags. When a change in light intensity of the surveilled scene occurs and the current pixel voltage ($V_P$) trespasses or violates one of the two thresholds, for example a transition from "light to dark" ($V_P > V_{MAX}$) has taken place or a transition "dark to light" ($V_P < V_{MIN}$) has occurred, the pixel status, as shown in FIG. 1A changes. The line marked as $V_P$ shows the change in pixel charge caused by changes in light intensity of the scene. Markings f0 through f20 mark sampled video frames. The pixel can be set into one of two states: a "normal state" (also termed "cold state") and a "hot state". These states are defined using two digital status flag lines which can be, as it is explained below, in one and only one of the H, M or L states. Lines $V_{MAX}$ (maximum threshold) and $V_{MIN}$ (minimum threshold) are voltage lines with a programmable time-constant, computed by two analog Switched-Capacitor Low-Pass Filters (SCLPF) (FIG. 3). When the photoactive area of the pixel (photodiode) generates a voltage exceeding one of the thresholds in response to scene illumination, the pixel is set into a "hot-pixel" state. After a certain exposure time, the current photodiode or pixel voltage ($V_P$) is compared with both $V_{MAX}$ and $V_{MIN}$, providing two-bits per pixel (the two comparator outputs: $Q_{MAX}$, $Q_{MIN}$), which define one of the three possible pixel states, H, M, L. Where:

H [0,1]: $V_P > V_{MAX}$; hot pixel due to light to dark transition;
M [0,0]: $V_{MAX} > V_P > V_{MIN}$; "normal" pixel, no significant variation in the illumination level (area between the two lines marking $V_{MAX}$ and $V_{MIN}$ in FIG. 1A/B);
L [1,0]: $V_P < V_{MIN}$; hot pixel due to dark to light transition.
X[1,1] is a forbidden state which can never occur.

FIG. 1A shows a change in the illumination or light intensity of the scene causing pixel voltage ($V_P$) variations. $V_{MAX}$ and $V_{MIN}$ are asymmetrically updated. In case of "hot-pixel" ($V_P > V_{MAX}$ or $V_P < V_{MIN}$), $V_{MAX}$ or $V_{MIN}$ are updated at every frame. Under "normal" pixel condition ($V_{MAX} > V_P > V_{MIN}$) $V_{MAX}$ and $V_{MIN}$ are updated once every two frames. FIG. 1B shows the same change in the illumination or light intensity. The difference with respect with FIG. 1A is that, under "normal" pixel condition, $V_{MAX}$ and $V_{MIN}$ are updated once every three frames, turning into a reduction in the two SCLPFs frequency response of the pixel. FIGS. 1A and 1B also illustrate the two comparator outputs: $Q_{MAX}$, $Q_{MIN}$ that are different in their duration and proportional to the duration of the pixel disposition in one of the hot pixel states H (0, 1) or L (1, 0). The FIG. also illustrates that the $V_{MAX}$ and $V_{MIN}$ threshold values are adaptive values and change according to the illumination level. The $V_{MAX}$ and $V_{MIN}$ values are processed by the pixel and two outputs of the pixel are binary values ($Q_{MAX}=0$ for $V_P > V_{MAX}$ and $Q_{MIN}=1$ for $V_P < V_{MIN}$). This binary image may now be processed externally by a higher-level processor (either embedded or external) capable of implementing additional complex tasks.

The updating of the threshold depends on at least three values:
Current voltage level of the thresholds,
Current voltage level of the pixel, and
State of the pixel.

When the pixel state is "normal" and the threshold voltage level is beyond the pixel voltage level (i.e. higher than $V_{MAX}$ if this is the high threshold or lower than $V_{MIN}$ if this is the low threshold), then the threshold level will move towards the pixel level at a first rate; if on the other hand the threshold is within the pixel voltage level (i.e. lower if this is the high threshold or higher if this is the low threshold) then the threshold level will move away from the pixel level at a second rate; third and fourth rates can be defined in case the pixel status is "hot". This mechanism could be used to optimize the performance of the apparatus and method disclosed herein.

Figure 2:
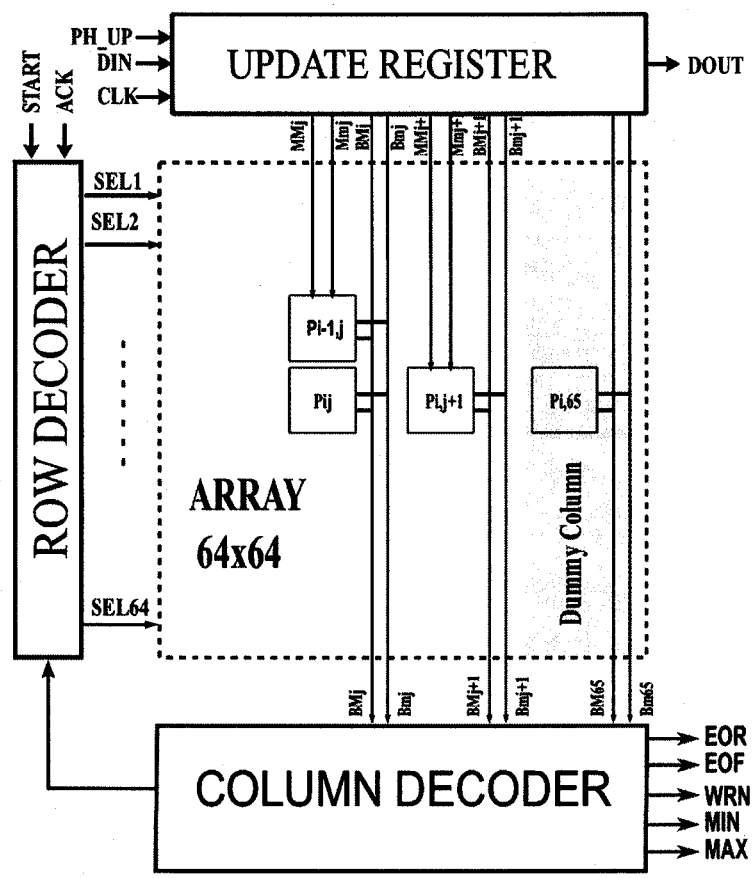
FIG. 2 is an example of a block diagram of the present sensor architecture.

FIG. 2 is an example of a block diagram illustrating the present sensor architecture. In the present example the sensor is an array of 64×64 pixels, but other numbers of pixels are possible. The sensor is an addressable array of pixels, which is progressively addressed by a 64-cell ROW DECODER and a 64-cell COLUMN DECODER. The UPDATE REGISTER consists of a 64×2-scene shift-register with two main functions:

READOUT: after row-selection (SELi), bit-lines (BMj, Bmj) are loaded into the UPDATE REGISTER and read out serially, through $D_{OUT}$, CLK;
UPDATE: after a row selection, a 64×2-bits binary mask (two bits/pixel: Mmin, Mmax) is serially loaded into the UPDATE REGISTER, through $D_{IN}$, CLK. PH_UP is pulsed, updating only the selected pixels of the row (having MMj=1 or Mmj=1). After this, the next row is selected and a new row of masks is loaded in to the UPDATE REGISTER.

FIG. 3 is an example of the present pixel schematic. The pixel includes two Switched-Capacitor Low-Pass Filters (SCLPF1, SCLPF2) and two clocked comparators (CMP1, CMP2). The photodiode operates in storage mode, buffered by a source follower (BUF0). This source follower is turned on by Vp_clk only when necessary, further reducing the pixel DC power consumption. The two low pass filters SCLPF1 and SCLPF2, fed by $V_P$, compute $V_{MAX}$ and $V_{MIN}$ respectively, with a clock running up to the frame rate. The filter operation is controlled by the UPDATE REGISTER (FIG. 2) through the lines MMj, Mmj (with j=1 to 64), which directly drive the two MOS switches (MSW1 and MSW2) of the second-stage of the filter. In order to minimize leakage current in the MOS channel during the hold-state, the switches MSW1 and MSW2 together with MSH1 and MSH2 are forced into accumulation. The UPDATE REGISTER, which is a 64×2 bits custom mask/row, facilitates independent programming of each of the SCLPFs frequency response. This operation can be done at the end of each frame, during the imager readout phase. After selecting one row of the array, the 64×2 bits data of the row are read out through $D_{OUT}$ by clocking CLK. At the same time, a proper 64×2 bits sequence of masks is applied at DIN and loaded into the UPDATE REGISTER. After this, a proper mask configuration is available on MMj, Mmj (j=1 to 64). The update command is now applied, which activates only those SCLPFs having MM/Mm=1. In this way, only the selected memories are updated ($V_{MAX}$, $V_{MIN}$). Next row is then selected and read out and a new row of masks is uploaded. This operation is repeated 64 times, or as many times as there are rows of the sensor. The SCLPF filters transfer function is:

$$H(s) = \frac{1}{1+s\tau} = \frac{1}{1+s\left(\frac{C_2}{C_1} \cdot \frac{n}{f_o}\right)} \quad (1)$$

where $C_1=C_{1m}=C_{1M}$ and $C_2=C_{2m}=C_{2M}$ and $C_1$ and $C_2$ are the filter capacitors. The value of the integer "n" can be arbitrarily set acting on the two control lines MM, Mm, which facilitates the pixel update phase, controlling the two MOS transistors MSW1 and MSW2 respectively. For example, in FIG. 1A the number "n" is set to "1" under "hot-pixel" condition and to "2" under "normal" condition, forcing an asymmetric behavior of the two filters SCLPFs. The same for FIG. 1B, where "n=3" under "normal" condition.

In one example, setting the memory loses one bit of voltage accuracy, which in this exemplary design is 10 mV on a 6-bit scale, in 1 second, with an incident light which saturates the photodiode in 1 msec, reaching a voltage drop of about 1V. This value of memory loss seems to be acceptable and supports the robustness of the algorithm. Usually, $V_{MAX}$ or $V_{MIN}$ may be maintained for several frames, with no update and compared with the current voltage level $V_P$. Other values of memory loss could also be accepted.

Voltage levels $V_{MAX}$ or $V_{MIN}$ are compared with the photodiode (pixel) voltage ($V_P$) using the two clocked comparators (CMP1, CMP2). The outputs of the comparators are then available at the output of the pixel, on the two bit-lines ($B_{MAX}$, $B_{MIN}$), after activating the row selection (SEL). $B_{MAX}$ and $B_{MIN}$ in FIG. 3 correspond to $Q_{MAX}$ and $Q_{MIN}$ in FIG. 1A and FIG. 1B. $B_{MAX}=1$ detects a "hot-pixel" condition related to $V_{MAX}$ ($V_P>V_{MAX}$), while $B_{MIN}=1$ detects a "hot-pixel" condition for $V_{MIN}$ ($V_P<V_{MIN}$). Referring to FIG. 3, a "hot-pixel" condition is therefore defined by the logic OR of $B_{MAX}$ with $B_{MIN}$ ("hot-pixel"=$B_{MAX} \oplus B_{MIN}$).

Figure 4A:
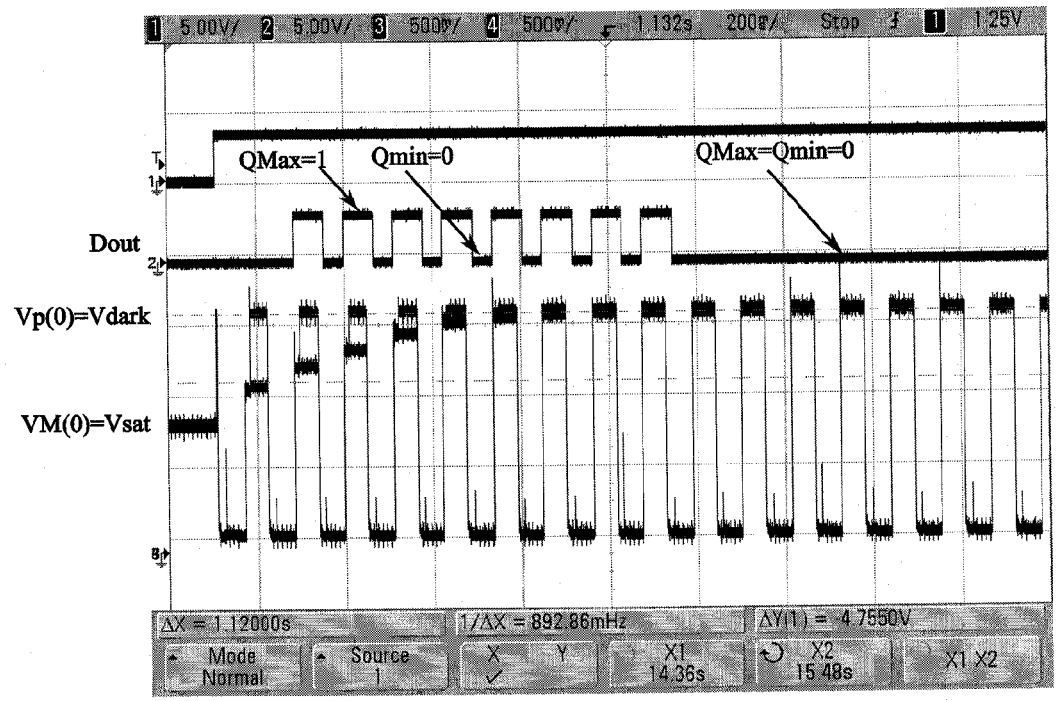
FIGS. 4A and 4B illustrate two basic pixel operation states.
Figure 4B:
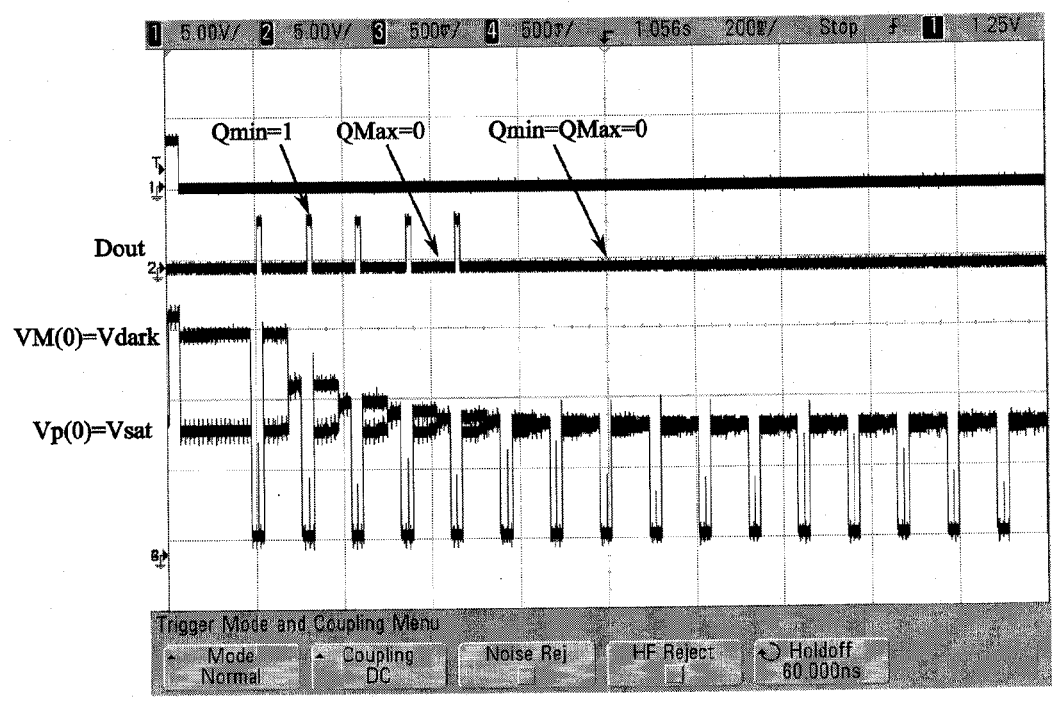

FIGS. 4A and 4B collectively termed FIG. 4 illustrate two basic pixel operation states. The states relate to transition from light to dark scene (step-up transition) and from dark to light scene (step down transition). The filter time-constant for transition from light to dark scene, where the memory voltage $V_M$ starts from saturation ($V_{SAT}$) and reaches the current value $V_P=V_{DARK}$ requires in this example about 8 frames to settle from "hot-pixel" state to "normal" pixel state. In the transition from dark to light scene the memory voltage $V_M$ starts from the highest value ($V_{DARK}$) and reaches the current value $V_P=V_{SAT}$. The process takes about 5 frames to settle. Due to mismatch between the processes and capacitive coupling, the two processes may not necessarily have the same time constant. This is corrected by a feedback loop built-into the sensor facilitating a direct control over each pixel.

Figure 5:
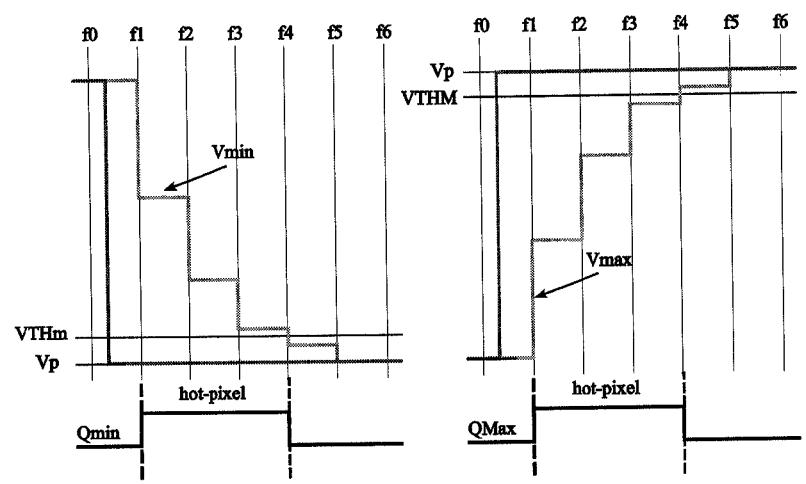
FIG. 5 illustrates an example of a comparator offset (VTHM) defining safe margins of the present pixel operation.

FIG. 5 illustrates an example of a comparator offset (VTHM) defining safe margins of the present pixel operation. At the end of the exposure time, the two clocked comparators (CMP1, CMP2) compare the current photodiode or pixel voltage $V_P$ with $V_{MAX}$ and $V_{MIN}$ respectively, providing two bits describing the status of the pixel. The two comparators have complementary built-in offsets (VTHM, VTHm), allowing a safe margin and noise immunity in the "hot-pixel" detection.

The pixel architecture described above may be implemented in an image sensor operative to sense and process a captured image. Such sensor would initially operate in a type of image event determination mode where it will set two voltage levels determining the threshold voltages $V_{MAX}$ and $V_{MIN}$. As long as the scene illumination does not change and the voltage generated by the pixels is within the $V_{MAX}$–$V_{MIN}$ range the pixel may be considered as "normal" or "cold pixel". Any change in the scene or captured illumination causing the sensor to operate at voltage levels different from the determination mode voltage levels will trigger an image event detection mode. The image event detection mode, upon detecting voltage levels different from the determination mode voltage levels, changes the pixel status to a hot-pixel status. The image event detection mode would generate a signal initiating a processing mode. The processing mode accepts the signal generated by the event detection mode, processes the signal, and communicates the signal processing results through a communication link to an external processor. If the number of "hot-pixels" is below a given threshold, no output is communicated out of the sensor. Otherwise, "hot-pixel" locations are communicated to an on-board or external auxiliary processor, providing a binary or digital bitmap of the "hot-pixels". This communication process is the main energy consuming process and it consumes an amount of electric energy substantially larger than internal processing mode consumes. As will be clear to anyone skilled in the art of electronics design, further information can be supplied on demand, including grey level data, threshold data etc. Further, as will be clear to anyone skilled in the art of electronics design, the auxiliary processor could be designed to spend most of its time in a sleep mode to conserve energy, and only wake up to process a given frame when the frame is warranted.

Figure 6:
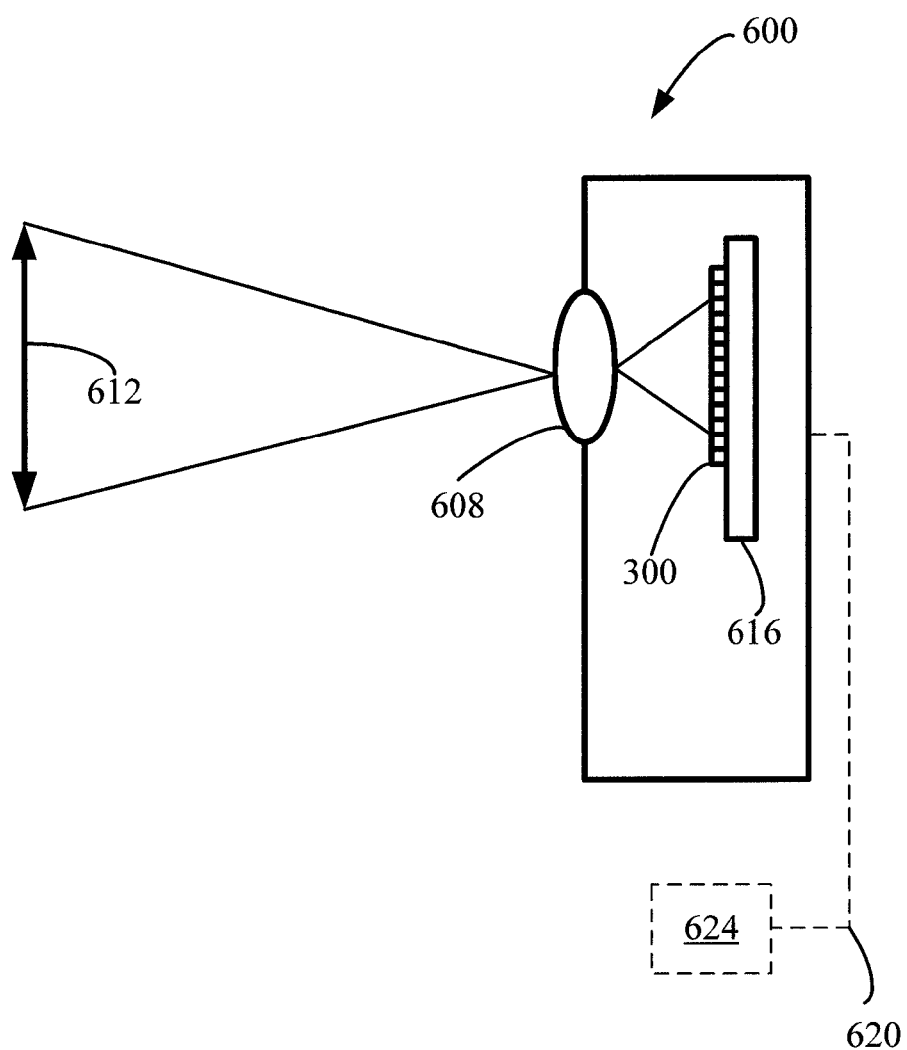
FIG. 6 is a schematic illustration of an image sensing apparatus employing a sensor with the present pixel.

FIG. 6 is a schematic illustration of an image sensing apparatus employing a sensor with the present pixel. Apparatus 600 includes an imaging unit, which may be a lens 608 having an appropriate field of view and resolution to capture the surveilled scene 612 and image the scene on an image sensor 616. The image sensor 616 includes a plurality of pixels 300 (FIG. 3) operative to sense the changes in the scene illumination. Each pixel includes a status flag, a current pixel status value, and a memory keeping trace of historical pixel status values along time. If the changes in illumination values of the scene are such that they cause pixel response values substantially different from the historical pixel operating range, the apparatus changes the status flag of the pixel and communicates through a communication link 620 operative to communicate to an external processor 624 a change of the pixel status. Comparing the current pixel status to the historical status development enhances the reliability and efficiency of event detection without increasing the complexity of image processing.

Figure 7:
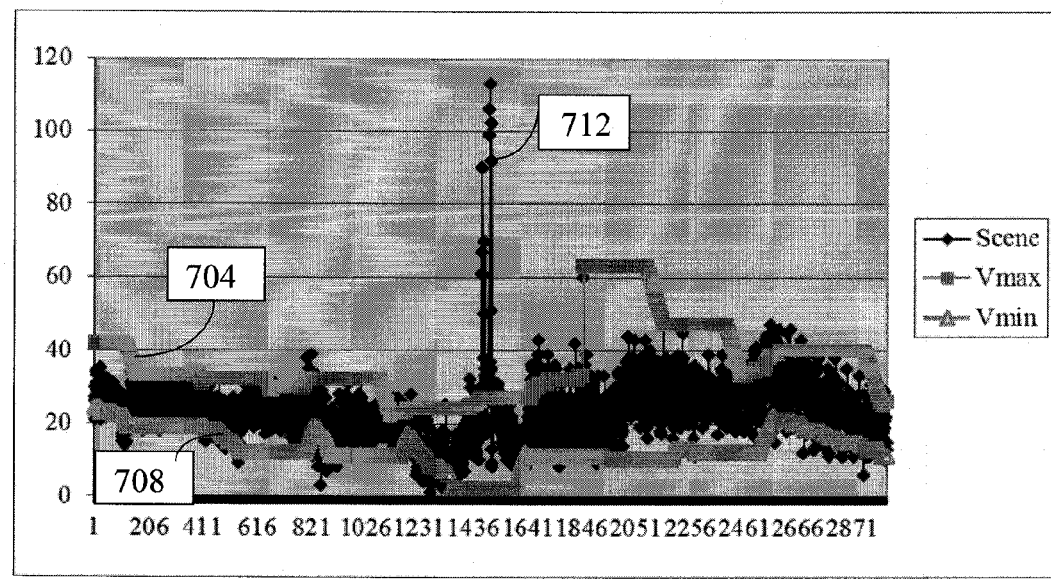
FIG. 7 is an actual recording from a single pixel by the present image sensing apparatus of an actual scene with natural illumination changes.

FIG. 7 is an actual recording from a single pixel by the present image sensing apparatus of an actual scene with natural illumination changes. Reference numerals 704 and 708 mark $V_{MAX}$ and $V_{MIN}$ respectively. Numeral 712 marks an abrupt change caused by a physical intrusion into the scene.

For the sake of clarity, for the vision sensor with a supply voltage of 3.3V, the photodiode voltage range is $1V<V_P<3V$, where under dark conditions $V_P=V_{DARK}=3V$ and under saturation $V_P=V_{SAT}=1V$. The "hot-pixel" thresholds can change between $0.9V<V_{MIN}<3.1V$ and $0.9V<V_{MAX}<3.1V$. All the values mentioned above are strictly related to the sensor supply voltage.

The described pixel architecture of the present vision sensor senses and converts into digital values the changes in scene illumination. Processing of the digital values by the pixel minimizes the current related to charge transfer and the electric power required for such transfer. In situ processing of the captured and digitized information substantially reduces the bandwidth required for data transfer. The reduction of power consumption and bandwidth required enable deployment of sensor networks over large areas, opening the scope for new applications.

What is claimed is:

1. A pixel of an image sensor, said pixel comprising:
a photosensitive area;
at least one embedded memory storing at least one historical voltage threshold for said pixel;
a low pass filter; and
wherein a current voltage level (Vp) of the pixel represents light intensity on said pixel; and
wherein an output of the low pass filter is used to update at least one voltage threshold according to the current voltage level (Vp).

2. The pixel according to claim 1 wherein said pixel has two internal possible pixel states: "hot" pixel and "cold" pixel state.

3. The pixel according to claim 1 wherein said at least one voltage threshold is updated by the pixel and wherein said pixel provides to an external processor with two pixel outputs.

4. The pixel according to claim 1 wherein at least one voltage threshold is updated periodically.

5. The pixel according to claim 1, wherein the update of at least one voltage threshold depends on:
current voltage level of the at least one threshold; current voltage level of the pixel; and state of the pixel.

6. The pixel according to claim 1 further comprising at least one clocked comparator.

7. The pixel according to claim 6 wherein the at least one clocked comparator has complementary built-in offsets, said offsets allowing a safe margin and noise immunity in a "hot" status detection.

8. The pixel according to claim 6 wherein the at least one low pass filter updating the at least one threshold operates in an asymmetric mode.

9. The pixel according to claim 6 wherein the update of the at least one voltage threshold is performed at least once every two frames, reducing low pass filter frequency response.

10. The pixel according to claim 1 wherein the update of at least one voltage threshold is performed at most once every frame.

11. The pixel according to claim 1 where the at least one voltage threshold are two thresholds Vmax (maximum threshold) and Vmin (minimum threshold).

12. The pixel according to claim 11 wherein update frequency is asymmetric for Vp between Vmin and Vmax and for Vp not between Vmin and Vmax.

13. The pixel according to claim 11 where Vmin and Vmax are assigned so that a pixel is "hot" approximately every 100 frames.

14. The pixel according to claim 1 wherein voltage update includes Vmax update and wherein Vmax moves towards Vp at a first rate, if Vp is higher than Vmax.

15. The pixel according to claim 1 wherein voltage update includes Vmin update and wherein Vmin moves away from Vp at a second rate if Vp is between Vmin and Vmax.

16. The pixel according to claim 1 wherein control lines control a frequency response of at least one Switched-Capacitor Low-Pass Filter.

17. The pixel according to claim 16 wherein UPDATE REGISTER facilitates independent programming of each Switched-Capacitor Low-Pass Filter frequency response.

18. A method of pixel status detection in an image sensor including an array of pixels, each pixel includes at least one embedded memory, said method comprising:
setting at least one threshold voltage level;
detecting a current pixel voltage level Vp;
based on the at least one threshold voltage level and Vp, detecting at least one pixel status; and
updating at least one threshold voltage level according to Vp by use of a low pass filter.

19. The method according to claim 18 wherein said pixel status is one of group consisting of "cold" pixel status or "hot" pixel status and wherein image event detection mode further comprises: if a number of the "hot" pixel statuses is below a given threshold, said threshold is at least 2, no output is communicated out of the sensor; and if a number of "hot" pixel statuses exceeds given threshold, communicating to a processor "hot-pixel" locations.

20. The method according to claim 18 wherein a binary or digital bitmap of "hot-pixels" locations is provided.

21. The method according to claim 18 wherein change in pixel status initiates a further processing mode of an external processor being in sleep mode and conserving energy.

22. The method according to claim 18 wherein the at least one threshold voltage level includes two thresholds Vmax (maximum threshold) and Vmin (minimum threshold), and wherein when Vp of a pixel is not between Vmin and Vmax, pixel status is set to "hot" pixel status.

23. The method according to claim 18 wherein the at least one threshold voltage level includes two thresholds Vmax (maximum threshold) and Vmin (minimum threshold), and wherein when Vp of a pixel is between Vmin to Vmax, pixel status is set to "cold".

24. The method according to claim 18 wherein the at least one threshold voltage level includes two thresholds Vmax (maximum threshold) and Vmin (minimum threshold), and wherein updating Vmax and Vmin under "normal" pixel condition (Vmax>Vp>Vmin) is performed once every at most two frames.

25. The method according to claim 18 wherein the at least one threshold voltage level includes two thresholds Vmax (maximum threshold) and Vmin (minimum threshold), and herein updating Vmax and Vmin under illumination pixel condition (Vmax>Vp>Vmin) is updated at least once every three frames.

* * * * *